(12) United States Patent
Belisle et al.

(10) Patent No.: US 11,888,297 B2
(45) Date of Patent: Jan. 30, 2024

(54) ELECTRICAL SHIELDING TERMINATION SYSTEMS

(71) Applicant: Hamilton Sundstrand Corporation, Charlotte, NC (US)

(72) Inventors: Francis C. Belisle, Beloit, WI (US); Nhia Yang, Roscoe, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 18 days.

(21) Appl. No.: 17/716,506

(22) Filed: Apr. 8, 2022

(65) Prior Publication Data
US 2023/0327421 A1 Oct. 12, 2023

(51) Int. Cl.
*H02G 15/06* (2006.01)
*B64D 45/02* (2006.01)

(52) U.S. Cl.
CPC .......... *H02G 15/06* (2013.01); *B64D 45/02* (2013.01)

(58) Field of Classification Search
CPC . H01R 43/0263; H01R 24/38; H01R 13/6592
See application file for complete search history.

(56) References Cited

U.S. PATENT DOCUMENTS

| | | | |
|---|---|---|---|
| 4,019,802 A | 4/1977 | Shannon et al. | |
| 4,135,776 A | 1/1979 | Ailawadhi et al. | |
| 4,973,269 A | 11/1990 | Kilsdonk | |
| 5,782,270 A * | 7/1998 | Goett .................. | H01R 9/0521 138/123 |
| 6,439,929 B1 | 8/2002 | Jenets | |
| 2003/0227822 A1* | 12/2003 | Grieger .................. | G01V 1/201 367/20 |
| 2016/0087352 A1* | 3/2016 | Jaroschek ............ | H02G 15/113 439/801 |
| 2019/0020153 A1* | 1/2019 | Li ........................ | H01R 13/622 |

FOREIGN PATENT DOCUMENTS

FR 2990805 A1 11/2013

OTHER PUBLICATIONS

Extended European Search Report issued by Examiner Bertrand Hugueny, of the European Patent Office, dated Aug. 29, 2023, in corresponding European Patent Application No. 23164573.0.

* cited by examiner

*Primary Examiner* — Timothy J Thompson
*Assistant Examiner* — Rhadames Alonzo Miller
(74) *Attorney, Agent, or Firm* — Locke Lord LLP; Daniel J. Fiorello; Gabriella D'angelo (57) ABSTRACT

A conductor shielding termination assembly can include a housing tube defining an inner diameter housing channel therethrough and having housing threads on an outer diameter thereof. The housing tube can be made of conductive material. The assembly can include a shoulder bushing configured to insert within the inner diameter housing channel of the housing tube. The shoulder bushing can define an inner diameter bushing channel sized to receive an unshielded portion of a conductor. The assembly can include a jam nut comprising a nut inner diameter channel sized to receive a shielded portion of the conductor and nut threads on an inner diameter thereof configured to mesh with the housing threads. The jam nut and housing tube can be configured to trap a shielding termination within the meshed housing threads and jam nut threads.

17 Claims, 5 Drawing Sheets

ELECTRICAL SHIELDING TERMINATION SYSTEMS

FIELD

This disclosure relates to electrical shielding termination systems.

BACKGROUND

The standard applications for shielding of harnesses is shielding of a multi conductor bundle (harness) level for lightning threat level protection or for electromagnetic interference (EMI). The applications of high amperage power feeders, e.g., for high power electrical motors, is shielding for individual phases of feeder power. Shielding of large gauge power feeders is commonly not done due to vehicle weight impact, and then when shielding is done at the harness bundle level, the bundle bend radius is too large to facilitate installation. Thus, there is a difficulty in installation.

For the shielding to be effective for EMI performance, it needs to be a complete circumference connection with shield metal electrically connected to an electrically conductive housing around the feeder conductor. Shielding terminations to a housing or connectors is typically done with internal cone clamping geometry (which can be repairable) or with band clamps (which if crimped types are not repairable).

Such conventional methods and systems have generally been considered satisfactory for their intended purpose. However, there is still a need in the art for improved electrical shielding termination systems. The present disclosure provides a solution for this need.

SUMMARY

A conductor shielding termination assembly can include a housing tube defining an inner diameter housing channel therethrough and having housing threads on an outer diameter thereof. The housing tube can be made of conductive material. The assembly can include a shoulder bushing configured to insert within the inner diameter housing channel of the housing tube. The shoulder bushing can define an inner diameter bushing channel sized to receive an unshielded portion of a conductor. The assembly can include a jam nut comprising a nut inner diameter channel sized to receive a shielded portion of the conductor and nut threads on an inner diameter thereof configured to mesh with the housing threads. The jam nut and housing tube can be configured to trap a shielding termination within the meshed housing threads and jam nut threads.

The assembly can include a gasket configured to fit within the inner diameter of the jam nut to compress the shielding termination between the gasket and the shoulder bushing and/or housing tube to provide flexible compression and/or stress relief. The jam nut can include an inner flange configured to trap the gasket between the inner flange and the shielding termination.

The shoulder bushing can include a shoulder flange configured to seat the shoulder bushing to the housing tube and to contact the shielding termination. The shoulder bushing can be a non-conductive dielectric. The shoulder bushing flange can be flexible. The shielding termination can be sandwiched between the gasket and the shoulder bushing flange such that the shoulder bushing flange provides flexibility and/or stress relief to the shielding termination.

In certain embodiments, the housing threads and the nut threads can be square or smooth threads to prevent cutting of the shielding termination. In certain embodiments, the housing tube and/or shoulder bushing can be split into two or more pieces.

The jam nut can be conductive. In certain embodiments, the jam nut can be a C-clip configured to be fastened together to lock in place around the housing tube. In certain embodiments, the jam nut can be two halves configured to be fastened together around the housing tube.

In certain embodiments, the assembly can include the conductor passing through the shoulder bushing. The shielding of the conductor can include the shielding termination, and the shielding termination can be separated from the conductor and terminate between the housing tube and the jam nut.

In accordance with at least one aspect of this disclosure, an aircraft electrical system can include a conductor having a shielding, the shielding comprising a shielding termination. The system can also include a conductor shielding termination assembly, e.g., as disclosed herein, e.g., as described above.

In accordance with at least one aspect of this disclosure, a method can include terminating a shielding of a conductor in an aircraft system between the threads of a plurality of conductive components. Terminating can include separating an insulated portion from the shielding by expanding an end of the shielding, placing the end of the shielding around a conductive housing tube having housing threads, and meshing one or more nut threads of a jam nut with the housing threads with the shielding therebetween. The method can include any other suitable method(s) and/or portion(s) thereof.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1A:
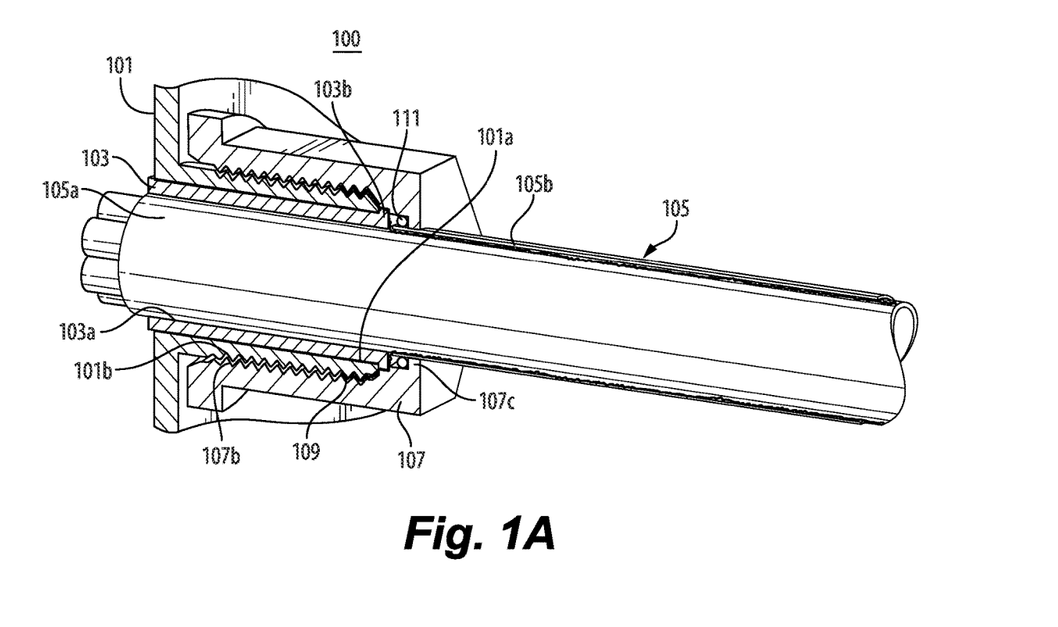
FIG. 1A is a cross-sectional schematic of an embodiment of an assembly in accordance with this disclosure.

Reference will now be made to the drawings wherein like reference numerals identify similar structural features or aspects of the subject disclosure. For purposes of explanation and illustration, and not limitation, an illustrative view of an embodiment of an assembly in accordance with the disclosure is shown in FIGS. 1A and 1s designated generally by reference character 100. Other embodiments and/or aspects of this disclosure are shown in FIGS. 1B through 6. Certain embodiments described herein can be used to properly terminate conductor shielding, e.g., in a high voltage system.

Figure 1B:
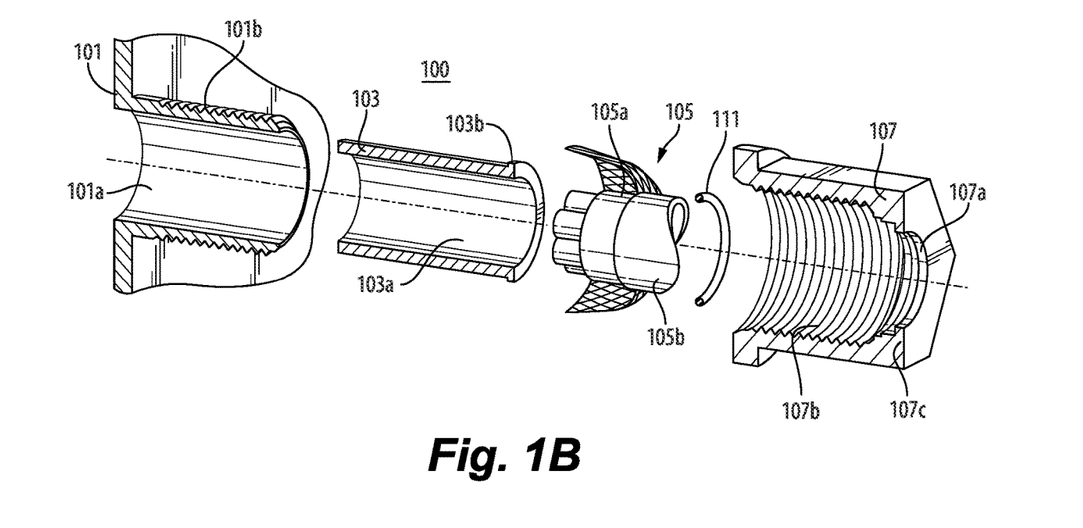
FIG. 1B is an exploded view of the embodiment of FIG. 1B.

Referring to FIGS. 1A and 1B, a conductor shielding termination assembly 100 can include a housing tube 101 defining an inner diameter housing channel 101a therethrough and having housing threads 101b on an outer diameter thereof. The housing tube 101 can be made of conductive material, for example (e.g., a metal).

The assembly 100 can include a shoulder bushing 103 configured to insert within the inner diameter housing channel 101a of the housing tube 101. The shoulder bushing 103 can define an inner diameter bushing channel 103a sized to receive an unshielded portion 105a of a conductor 105.

The assembly 100 can include a jam nut 107 comprising a nut inner diameter channel 107a sized to receive a shielded portion 105b of the conductor 105 and nut threads 107b on an inner diameter thereof configured to mesh with the housing threads 101b. The jam nut 107 and housing tube 101 can be configured to trap a shielding termination 109 within the meshed housing threads 101b and jam nut threads 107b, e.g., as shown in FIG. 1A.

The assembly 100 can include a gasket 111 (e.g., a flexible o-ring) configured to fit within the inner diameter of the jam nut 107 to compress the shielding termination 109 between the gasket 111 and the shoulder bushing 103 and/or housing tube 101 to provide flexible compression and/or stress relief. The jam nut 107 can include an inner flange 107c configured to trap the gasket 111 between the inner flange 107c and the shielding termination 109.

The shoulder bushing 103 can include a shoulder flange 103b configured to seat the shoulder bushing 103 to the housing tube 101 and to contact the shielding termination 109. In certain embodiments, the shoulder bushing 103 can be a non-conductive dielectric material (e.g., silicone). The shoulder bushing flange 103b (and/or the entire shoulder bushing 103) can be flexible. For example, the shielding termination 109 can be sandwiched between the gasket 111 and the shoulder bushing flange 103b such that the shoulder bushing flange 103b provides flexibility and/or stress relief to the shielding termination 109. In this regard, the contact area where the shielding termination 109 is supported within the assembly 100 can be flexible on both sides and can prevent stress fracturing of the shielding material (e.g., woven wires) by providing cushion to move and/or vibrate.

Figure 2:
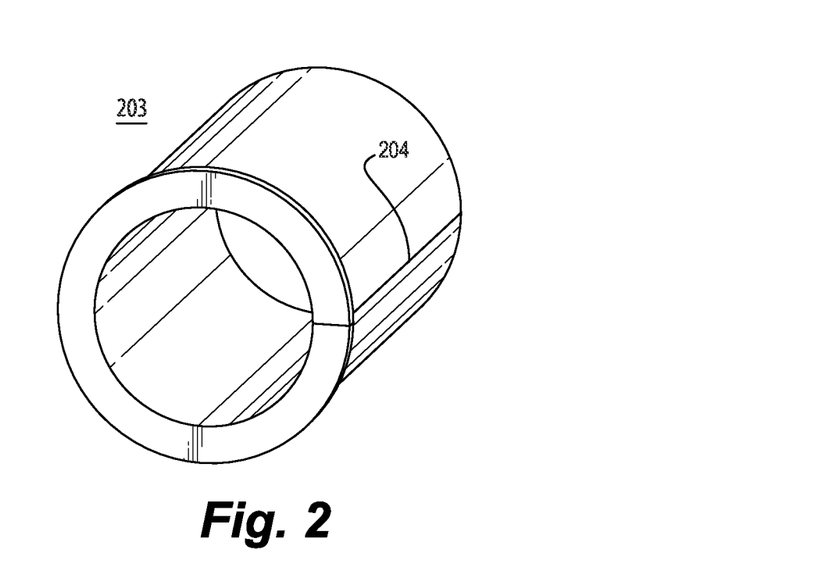
FIG. 2 shows a perspective view of an embodiment of a shoulder bushing in accordance with this disclosure, shown having a c-clip shape.

The shoulder bushing 103 can be a single continuous piece that forms a tube, and/or can be a c-clip type bushing 203 (e.g., as shown in FIG. 2). The shoulder bushing 103 can be comprised of any suitable number of separate pieces and/or have any suitable structural configuration.

Figure 3:
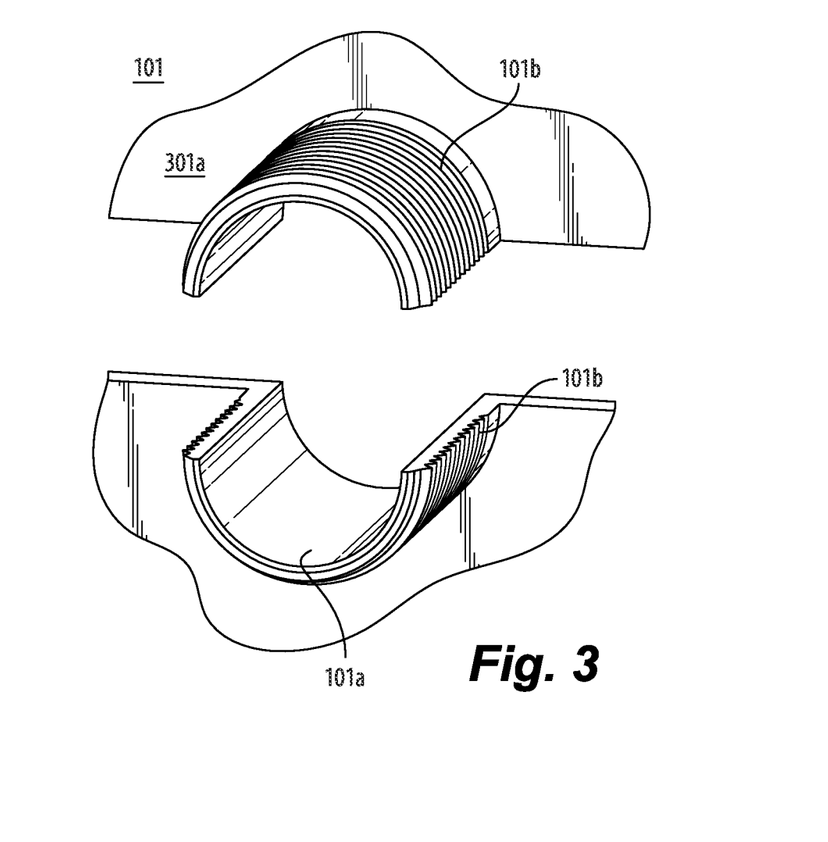
FIG. 3 shows an embodiment of a housing tube in accordance with this disclosure formed by two housing halves, showing the halves separated.

In certain embodiments, the housing threads 101b and the nut threads 107b can be square or smooth threads to prevent cutting of the shielding termination 109. Any suitable threads that mesh together are contemplated herein. Referring additionally to FIG. 3, in certain embodiments, the housing tube 103 and/or shoulder bushing 103 can be split into two or more pieces 301a, 301b.

In certain embodiments, the jam nut 107 can be conductive. In this regard, the housing tube 101 and the jam nut 107 can form the grounding circuit for the shielding 109, radially outward and separated from the unshielded portion 105a of the conductor 105.

Figure 4A:
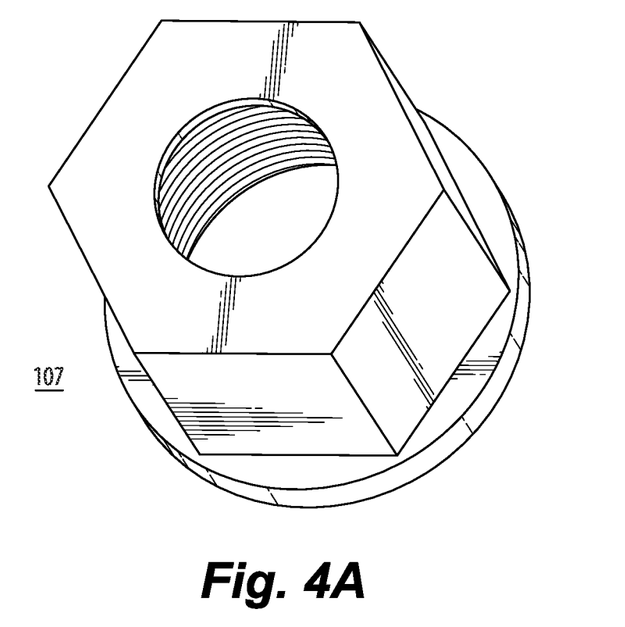
FIG. 4A shows a perspective view of an embodiment of a jam nut in accordance with this disclosure.
Figure 4B:
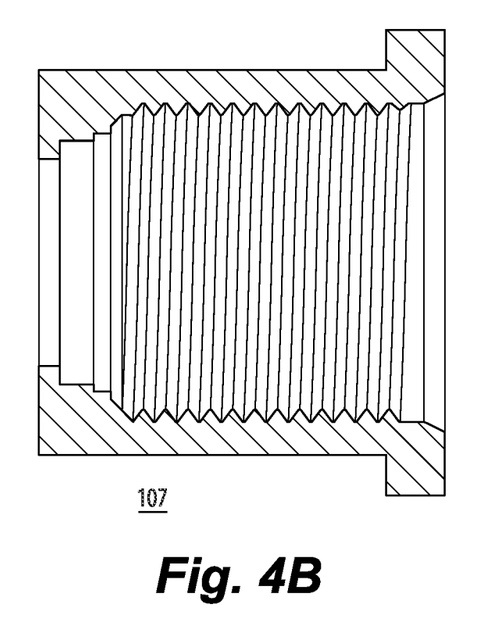
FIG. 4B shows a cross-sectional view of the embodiment of FIG. 4A.
Figure 5A:
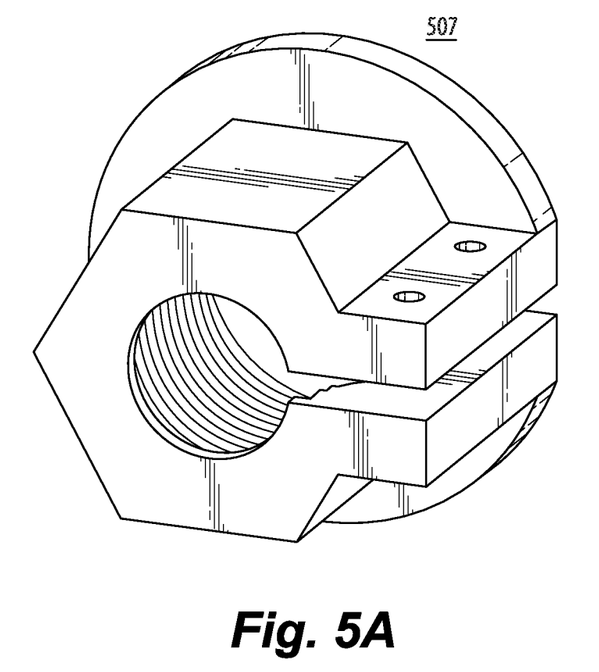
FIG. 5A shows another embodiment of a jam nut in accordance with this disclosure.
Figure 5B:
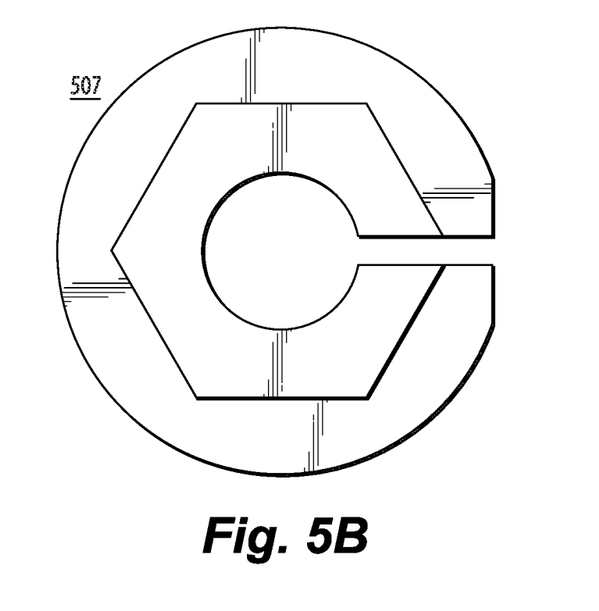
FIG. 5B shows an elevation view of the embodiment of FIG. 5A.
Figure 6:
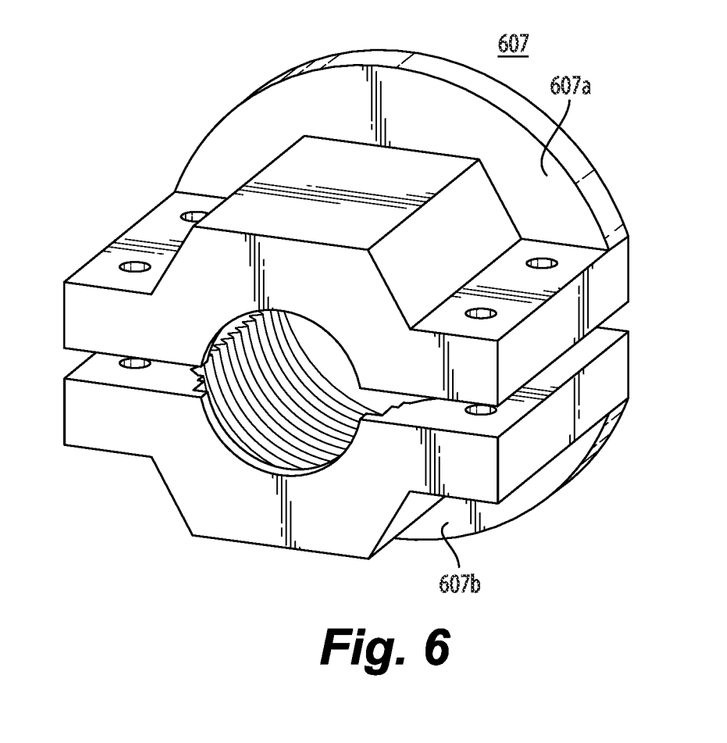
FIG. 6 shows a perspective view of an embodiment of a jam nut in accordance with this disclosure.

As shown in FIGS. 4A and 4B, the jam nut 107 can be a solid threaded screw-on nut. In certain embodiments, referring to FIGS. 5A and 5B, the jam nut 507 can be a C-clip configured to be fastened together (e.g., on one side as shown) to lock in place around the housing tube 101. In certain embodiments, the jam nut 107 can be two halves 607a, 607b configured to be fastened together around the housing tube 101. Any suitable configuration for the jam nut 607 is contemplated herein. Components having separable pieces may be more efficient to install on long conductors or already installed conductors that do not have a free end to allow a continuous piece to be slid over.

In certain embodiments, the assembly 100 can include the conductor 105 passing through the shoulder bushing 103. The shielding 109 of the conductor 105 can include the shielding termination 109, and the shielding termination 109 can be separated from the conductor 105 and terminate between the housing tube 101 and the jam nut 107. As shown, the shielding termination can be expanded outwardly in a cone shape to be trapped between the components.

In accordance with at least one aspect of this disclosure, an aircraft electrical system can include a conductor 105 having a shielding 109, the shielding comprising a shielding termination 109. The system can also include a conductor shielding termination assembly, e.g., assembly 100 as disclosed herein, e.g., as described above.

In accordance with at least one aspect of this disclosure, a method can include terminating a shielding of a conductor in an aircraft system between the threads of a plurality of conductive components. Terminating can include separating an insulated portion from the shielding by expanding an end of the shielding, placing the end of the shielding around a conductive housing tube having housing threads, and meshing one or more nut threads of a jam nut with the housing threads with the shielding therebetween. The method can include any other suitable method(s) and/or portion(s) thereof.

Embodiments can include threading the shield foil or braiding conductive shielding between metallic components outside the inner diameter of the assembly. This can keep electromagnetic emissions noisy ends of the braided shielding as far away from internal components as possible, and can also sandwich the shielding between two pieces of metal for better grounding. Embodiments can also provide stress/strain relief on the braided shielding using the flexible components, for example. Embodiments can also be arranged such that the assembly is waterproof/water resistant, and the assembly can also be repairable due to the removable nut, for example.

Embodiments can have a harness shield clamped for electrical termination between external thread of housing tube and jam nut. A gasket can be installed between the jam nut and the exposed shield and shield jacket. The jam nut can be one piece with a slit or two halves construction, for example, and can clamp the cable to provide cable support. A compliant dielectric shoulder bushing can be positioned around the harness insulation jacket and can provide support for the feeder harness going through housing tube.

The shoulder bushing edge can provide a stop for bushing in the installation and protection of the shield against housing tube edge. The shoulder bushing can be designed to have flange that extends over the housing tube so that this is where the bending portion of the shielding contacts the structure.

In embodiments, the harness shield can be exposed from the shield jacket and expanded forward. The harness shield can be routed over the housing tube conduit connection external thread and the jam nut can be used to clamp the shielding to the threads of housing. The harness can be routed with shoulder bushing into housing tube, and the gasket can provide jam nut corner to shield protection.

Embodiments can include an internally threaded jam nut with threads sized to account for shielding thickness. The harness can contact a compliant dielectric bushing (e.g., split or solid) placed around the insulation jacket harness and be placed in housing tube. The housing tube can be made of a split conductive housing.

In certain embodiments, one piece devices can be installed onto the feeder harness assembly before lug terminations. In certain embodiments, one piece devices can be installed onto the feeder harness assembly before lug terminations with split side for fasteners to clamp jam tight to housing threads. In certain embodiments, two piece (split) devices can be installed over feeder harness assembly after lug terminations or for certain repairable configuration with fasteners to clamp jam tight to housing threads.

Embodiments can provide electrical wire harness metal shielding termination on to a conductive cover housing with insulation around the bundle, with circumferential termination, with reworkable shield electrical bonding made by an internally threaded jam nut between shielding and the conductive housing externally threaded boss. The harness shielding can go over the outside of the conductive housing externally threaded boss.

In certain embodiments, a compliant dielectric shoulder bushing can be placed round the harness insulation harness up against the edge of the cable shielding, and is positioned inside the housing boss. In certain embodiments, a dielectric gasket can be put on the insulation jacket over the shield layer has that goes to the edge of the shielding. In certain embodiments, an internally threaded jam nut can be on the cable harness assembly shield insulation jacket from bonding the shield to the threaded housing boss. In certain embodiments, the shielding can be placed over the outside of the metallic externally threaded housing feed thru boss (part of the EMI housing) and a hex jam nut can be threaded over the shield braid (or foil) on to the housing external threads and tightened to clamp the shield material between external threads and internal threads.

Embodiments can provide shield termination to a conductive housing with strain relief insulation around the feeder, with circumference shield termination, and with reworkable shield bonding to the housing made by a threaded jam nut. The shielding can go over the outside of the conductive externally threaded boss. The insulated jacket of harness can have a dielectric bushing placed round the feeder and is positioned inside the housing boss. The shield insulation jacket can have a compliant dielectric gasket that goes to the edge of the shielding. The shielding can be placed over the outside of the externally threaded boss and the hex jam nut can be threaded over the shield braid on to the housing external threads and tightened to clamp the shield material between the threads.

Embodiments can provide 360 degrees (circumference) connection of shield material to conductive housing for complete enclosure of harness within the shield and continuing into a metallic conductive housing assembly. Embodiments can allow a shield to be ground connected to the housing at a distance away from the feeder electrical power connection for high voltage spacing robustness.

The conductive housing with the externally threaded boss which can be a feed thru tube part of the housing with the harness cable installed into the boss, or split at the center of the tube for half to be on a cover and half on the base, with the harness cable laid into the bottom half and terminated before the shield is terminated on to the housing. Such embodiments can allow the shielded feeder to be prepared with shielded material exposed, insulation adjusted and positioned from the electrical termination and be installed at the assembly point.

The shield connection or bonding connector to metal housing can be threaded jam nut to provide large grounding area for shield to housing, which is easily handled for installation and removal. The threaded jam nut can be a jam nut (which are installed on feeder before lugs are installed) or split (or two (2) piece) assembly (which can be installed after lugs are installed on feeder) which allows for repair. Embodiments can include a complaint shoulder bushing and gasket around the insulation protects the feeder insulation jackets from the housing feed through and the threaded jam nut for strain relief support and contamination (pollution) protection.

Shielding of power feeders for EMC/EMI protection allow reduced weight of system component filtering and will become the more common with system applications like electrical propulsion on aircraft.

Embodiments can provide circumference connection of shield to conductive housing for complete shielding of conductors within the housing assembly. The conductive housing with the externally threaded boss can have the harness laid into the threaded boss and is electrically terminated inside the housing. The shielded harness can be prepared and positioned from the electrical termination and be installed at the assembly point. The dielectric bushing and gasket around the insulation jacket can protect the insulation. Any other suitable benefits are contemplated herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A conductor shielding termination assembly, comprising:
   a housing tube defining an inner diameter housing channel therethrough and having housing threads on an outer diameter thereof, wherein the housing tube is made of conductive material;
   a shoulder bushing configured to insert within the inner diameter housing channel of the housing tube, the shoulder bushing defining an inner diameter bushing channel sized to receive an unshielded portion of a conductor;
   a jam nut comprising a nut inner diameter channel sized to receive a shielded portion of the conductor and nut threads on an inner diameter thereof configured to mesh with the housing threads, wherein the jam nut and housing tube are configured to trap a shielding termination within the meshed housing threads and jam nut threads; and
   a gasket configured to fit within the inner diameter of the jam nut to compress the shielding termination between the gasket and the shoulder bushing and/or housing tube to provide flexible compression and/or stress relief.

2. The assembly of claim 1, wherein the jam nut includes an inner flange configured to trap the gasket between the inner flange and the shielding termination.

3. The assembly of claim 2, wherein the shoulder bushing includes a shoulder flange configured to seat the shoulder bushing to the housing tube and to contact the shielding termination.

4. The assembly of claim 3, wherein the shoulder bushing is a non-conductive dielectric.

5. The assembly of claim 4, wherein the shoulder bushing flange is flexible, wherein the shielding termination is sandwiched between the gasket and the shoulder bushing flange such that the shoulder bushing flange provides flexibility and/or stress relief to the shielding termination.

6. The assembly of claim 5, wherein the jam nut is conductive.

7. The assembly of claim 6, wherein the housing threads and the nut threads are square or smooth threads to prevent cutting of the shielding termination.

8. The assembly of claim 1, wherein the housing tube and/or shoulder bushing is split into two or more pieces.

9. The assembly of claim 1, wherein the jam nut is C-clip configured to be fastened together to lock in place around the housing tube.

10. The assembly of claim 1, wherein the jam nut is two halves configured to be fastened together around the housing tube.

11. The assembly of claim 1, further comprising the conductor passing through the shoulder bushing, wherein a shielding of the conductor includes the shielding termination, wherein the shielding termination is separated from the conductor and terminates between the housing tube and the jam nut.

12. An aircraft electrical system, comprising:
   a conductor having a shielding, the shielding comprising a shielding termination; and
   a conductor shielding termination assembly, comprising:
      a housing tube defining an inner diameter housing channel therethrough and having housing threads on an outer diameter thereof, wherein the housing tube is made of conductive material;
      a shoulder bushing configured to insert within the inner diameter housing channel of the housing tube, the shoulder bushing defining an inner diameter bushing channel sized to receive an unshielded portion of a conductor;
      a jam nut comprising a nut inner diameter channel sized to receive a shielded portion of the conductor and nut threads on an inner diameter thereof configured to mesh with the housing threads, wherein the jam nut and housing tube are configured to trap the shielding termination within the meshed housing threads and jam nut threads; and
      a gasket configured to fit within the inner diameter of the jam nut to compress the shielding termination between the gasket and the shoulder bushing and/or housing tube to provide flexible compression and/or stress relief.

13. The system of claim 12, wherein the jam nut includes an inner flange configured to trap the gasket between the inner flange and the shielding termination.

14. The system of claim 13, wherein the shoulder bushing includes a shoulder flange configured to seat the shoulder bushing to the housing tube and to contact the shielding termination.

15. The system of claim 14, wherein the shoulder bushing is a non-conductive dielectric.

16. The system of claim 15, wherein the shoulder bushing flange is flexible, wherein the shielding termination is sandwiched between the gasket and the shoulder bushing flange such that the shoulder bushing flange provides flexibility and/or stress relief to the shielding termination.

17. A method, comprising:
   terminating a shielding of a conductor in an aircraft system between the threads of a plurality of conductive components, wherein terminating includes separating an insulated portion from the shielding by expanding an end of the shielding, placing the end of the shielding around a conductive housing tube having housing threads, and meshing one or more nut threads of a jam nut with the housing threads with the shielding therebetween.

\* \* \* \* \*